(12) United States Patent
Fullerton et al.

(10) Patent No.: US 7,893,803 B2
(45) Date of Patent: Feb. 22, 2011

(54) CORRELATED MAGNETIC COUPLING DEVICE AND METHOD FOR USING THE CORRELATED COUPLING DEVICE

(75) Inventors: Larry W. Fullerton, New Hope, AL (US); Mark D. Roberts, Huntsville, AL (US)

(73) Assignee: Cedar Ridge Research, New Hope, AL (US)

( * ) Notice: Subject to any disclaimer, the term of this patent is extended or adjusted under 35 U.S.C. 154(b) by 0 days.

(21) Appl. No.: 12/499,039

(22) Filed: Jul. 7, 2009

(65) Prior Publication Data

US 2009/0295522 A1 Dec. 3, 2009

Related U.S. Application Data

(63) Continuation-in-part of application No. 12/476,952, filed on Jun. 2, 2009.

(51) Int. Cl.
H01F 7/20 (2006.01)
(52) U.S. Cl. .................. 335/285; 335/306; 405/186; 441/92
(58) Field of Classification Search ............... 335/285, 335/302–306; 405/92, 186, 187; 441/108–119
See application file for complete search history.

(56) References Cited

U.S. PATENT DOCUMENTS

| 381,968 A | 5/1888 | Tesla |
|---|---|---|
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,570,625 A | 10/1951 | Zmmerman et al. |
| 2,722,617 A | 11/1955 | Cluwen et al. |
| 2,932,545 A | 4/1960 | Foley |
| 3,102,314 A | 9/1963 | Alderfer |
| 3,208,296 A | 9/1965 | Baermann |
| 3,288,511 A | 11/1966 | Tavano |
| 3,468,576 A | 9/1969 | Beyer et al. |

(Continued)

FOREIGN PATENT DOCUMENTS

FR 823395 1/1938

(Continued)

OTHER PUBLICATIONS

"BNS Series-Compatible Series AES Safety Controllers" pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—Craig A. Hoersten; William J. Tucker

(57) ABSTRACT

A compressed gas system component coupling device and method are described herein that use correlated magnets to enable a first component to be secured and removed from the second component. Some examples of components of the compressed gas system include a first stage regulator, a second stage regulator, an air pressure gauge, a dive computer, an air hose, a tank valve and a buoyancy control device. Furthermore the compression force created by the correlated magnets mounted on the first and second components create a hermetic seal therebetween.

24 Claims, 17 Drawing Sheets

U.S. PATENT DOCUMENTS

| | | | |
|---|---|---|---|
| 3,474,366 A | 10/1969 | Barney |
| 3,802,034 A | 4/1974 | Bookless |
| 4,079,558 A | 3/1978 | Gorham |
| 4,222,489 A | 9/1980 | Hutter |
| 4,453,294 A | 6/1984 | Morita |
| 4,547,756 A | 10/1985 | Miller et al. |
| 4,629,131 A | 12/1986 | Podell |
| 4,941,236 A | 7/1990 | Sherman |
| 5,050,276 A | 9/1991 | Pemberton |
| 5,367,891 A | 11/1994 | Furuyama |
| 5,383,049 A | 1/1995 | Carr |
| 5,631,093 A | 5/1997 | Perry et al. |
| 5,631,618 A | 5/1997 | Trumper et al. |
| 6,072,251 A | 6/2000 | Markle |
| 6,170,131 B1 | 1/2001 | Shin |
| 6,263,871 B1 * | 7/2001 | Brown et al. ......... 128/200.29 |
| 6,275,778 B1 | 8/2001 | Shimada et al. |
| 6,457,179 B1 | 10/2002 | Prendergast |
| 6,607,304 B1 | 8/2003 | Lake et al. |
| 6,666,622 B1 * | 12/2003 | Courtney et al. ........... 405/186 |
| 6,720,698 B2 | 4/2004 | Galbraith |
| 6,847,134 B2 | 1/2005 | Frissen et al. |
| 6,862,748 B2 | 3/2005 | Prendergast |
| 6,927,657 B1 | 8/2005 | Wu |
| 6,971,147 B2 | 12/2005 | Haltstead |
| 7,066,778 B2 | 6/2006 | Kretzschmar |
| 7,362,018 B1 | 4/2008 | Kulogo et al. |
| 7,444,683 B2 | 11/2008 | Prendergast et al. |
| 2004/0003487 A1 | 1/2004 | Reiter |
| 2006/0066428 A1 | 3/2006 | McCarthy et al. |
| 2006/0189259 A1 | 8/2006 | Park |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

FOREIGN PATENT DOCUMENTS

WO      2007081830 A2      7/2007

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

* cited by examiner

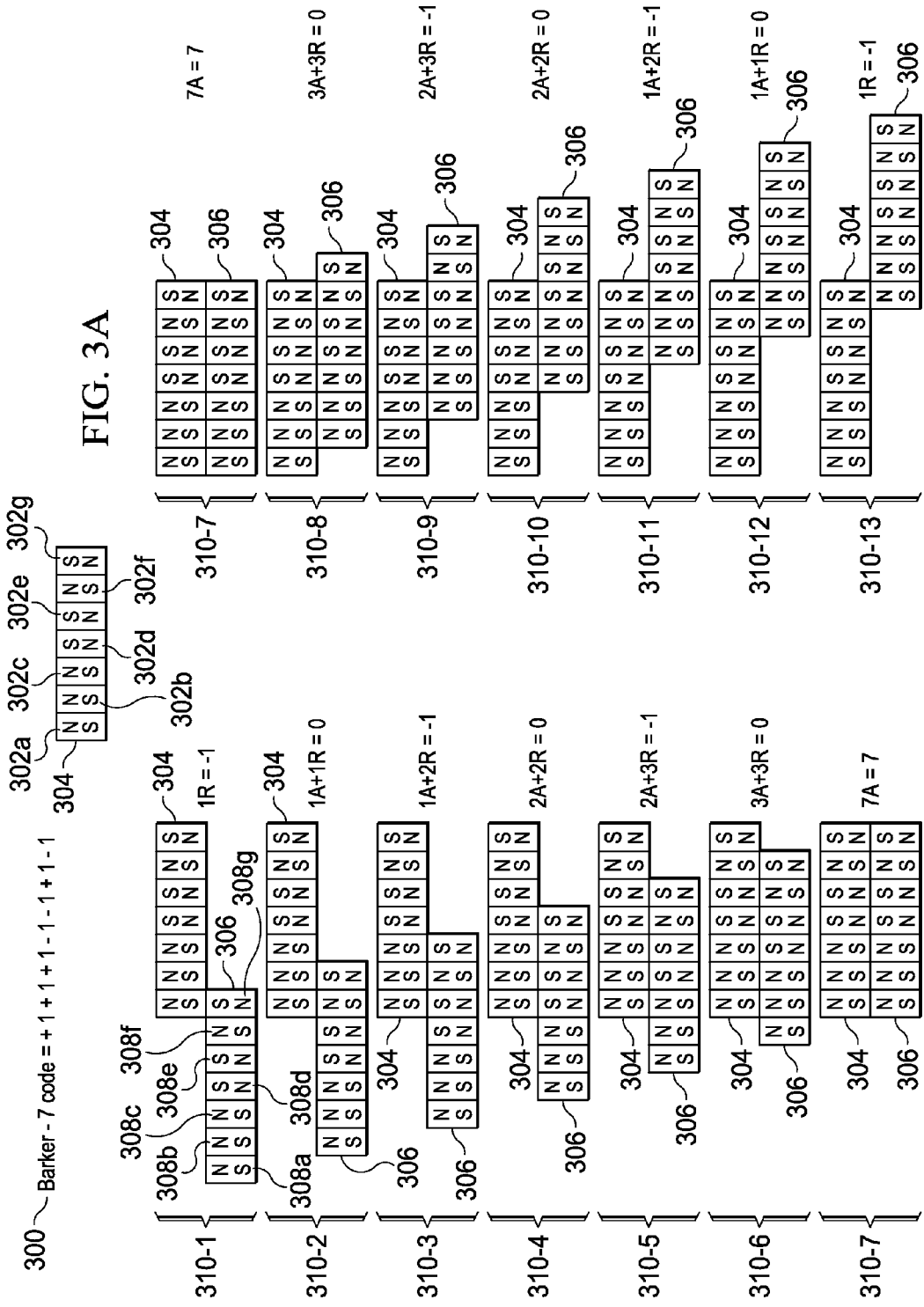

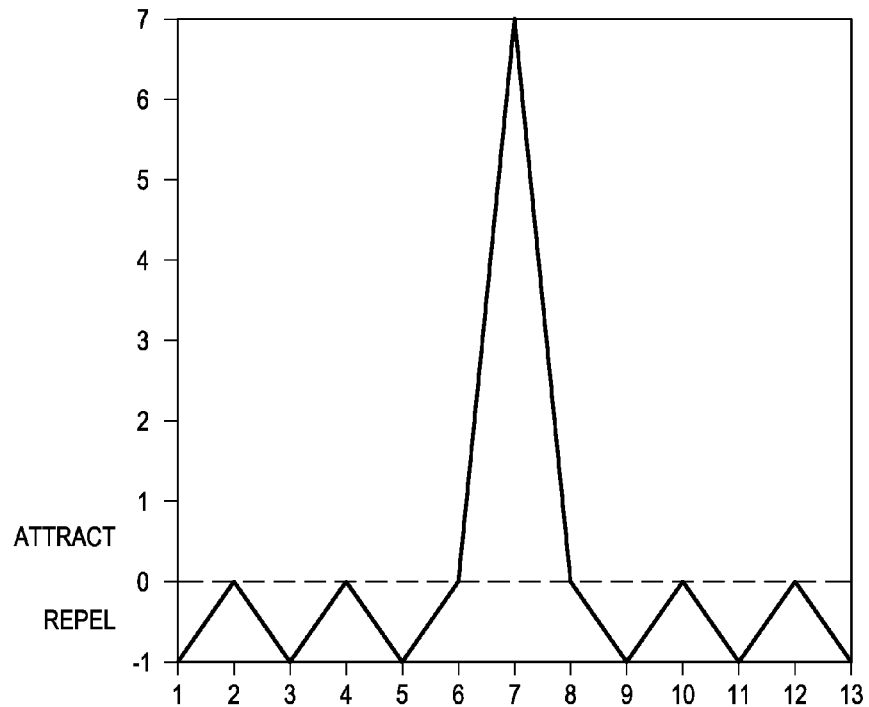
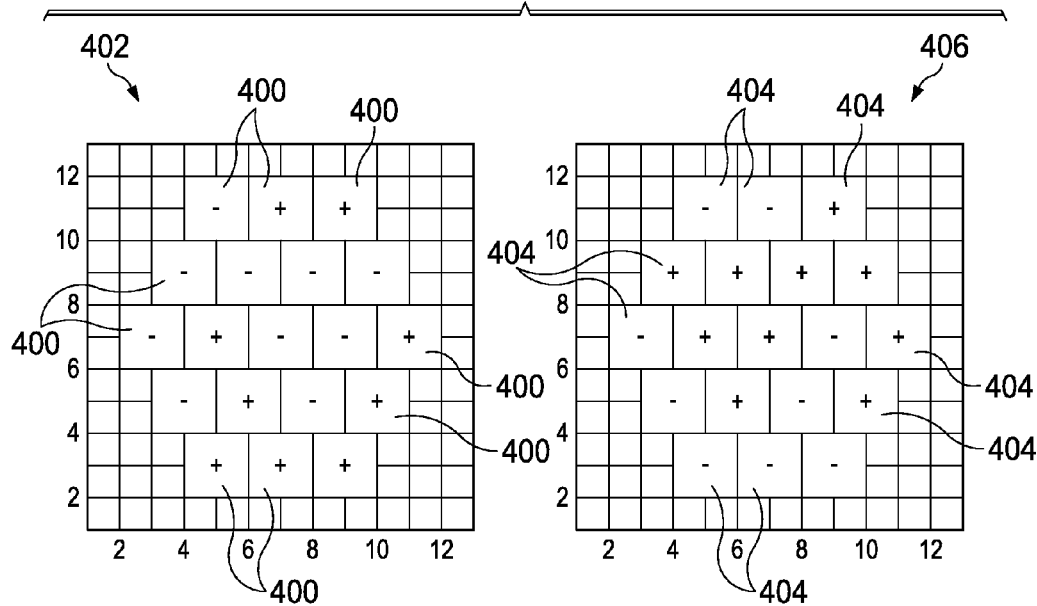

CORRELATED MAGNETIC COUPLING DEVICE AND METHOD FOR USING THE CORRELATED COUPLING DEVICE

CROSS REFERENCE TO RELATED APPLICATION

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a coupling device that uses correlated magnets enabling a user to easily connect or disconnect one or more components of a compressed gas delivery system. More specifically but not by way of limitation, some examples of compressed gas delivery system components include a first stage scuba regulator, a second stage scuba regulator, a gas pressure gauge, a compressed gas tank and a compressed gas hose. The present invention is demonstrated utilizing a scuba air delivery system.

DESCRIPTION OF RELATED ART

In the scuba diving field, an air delivery system typically consists of a compressed air or nitrox tank, a first stage regulator, a second stage regulator, an air pressure gauge, a buoyancy control device and at least one or more air hoses. It would be desirable to provide a person with a scuba air delivery system that can be easily connected with no tools and that also provides a method for attaching the components of the scuba air delivery system to the correct location and in the correct orientation. Unfortunately traditional coupling devices used to connect components of existing scuba air delivery systems utilize traditional fastening systems employing threads, spring loaded unions or other known fastening mechanisms which can fail or wear out over time and can require a greater degree of dexterity on the part of the person to use in order to properly assemble the components of a scuba air delivery system. For example, existing scuba air delivery systems employ a first stage regulator that is coupled to a compressed air tank utilizing threads. These threads are easily cross-threaded when a diver is attempting to secure the first stage regulator to the tank when located on a boat that is lurching and rolling in the seas. Additionally, many novices can mount the first stage regulator incorrectly creating additional problems.

Accordingly, there has been a need for a new coupling device and method for releasably securing components of a scuba air delivery system that addresses the aforementioned shortcomings and other shortcomings associated traditional coupling devices utilized to operably couple components of a scuba air delivery system.

SUMMARY

In one aspect, the present invention provides a coupling device, more specifically but not by way of limitation a coupling device that is integrally mounted into the mateable components of a scuba air delivery system such as but not by way of limitation a first stage regulator, a second stage regulator, an air hose, an air gauge, a dive computer, a buoyancy control device, and a compressed air tank. An exemplary coupling device functioning to operably couple a first stage regulator with a compressed air tank wherein the first stage regulator includes at least one portion that is designed to be operably secured to the compressed air tank having integrated thereon a first magnetic field emission structure where the first magnetic field emission structure interacts with a second magnetic field emission structure that is integrally mounted on the compressed air tank, wherein each of the first and second magnetic field emission structures comprise an array of field emission sources each having positions and polarities relating to a desired spatial force function that corresponds to a relative alignment of the first and second magnetic field emission structures within a field domain. The first stage regulator can be releasably secured to the compressed air tank when the first and second magnetic field emission structures are adjacent one another and have a certain alignment with respect to one another. The first stage regulator can be released from the compressed air tank when the first and second magnetic field emission structures are rotated with respect to one another. This is possible because each field emission source of each array of field emission sources has a corresponding field emission amplitude and vector direction determined in accordance with the desired spatial force function, wherein a separation distance between the first and second magnetic field emission structures and the relative alignment of the first and second magnetic field emission structures creates a spatial force in accordance the desired spatial force function. And, the field domain corresponds to first field emissions from the array of first field emission sources of the first magnetic field emission structure interacting with second field emissions from the array of second field emission sources of the second magnetic field emission structure.

In another aspect, the present invention provides a method for using a coupling device to operably couple at least two components of a scuba air delivery system that includes at least the steps of: (a) selecting a first component of a scuba air delivery system from a group of components such as but not limited to a compressed air tank, an air hose, a first stage regulator, an air gauge, a second stage regulator or a dive computer where the component has integrally secured thereon a first magnetic field emission structure and (b) selecting a second component of a scuba air delivery system from a group of components such as but not limited to a compressed air tank, an air hose, a first stage regulator, an air gauge, a second stage regulator or a dive computer where the component has integrally secured thereon a corresponding second magnetic field emission structure (c) securing the first component to the second component, such that the first magnetic field emission structure integrally mounted on the first component is adjacent to the corresponding second magnetic field emission structure integrally mounted on the second component, where the first component is releasably secured to the second component when the first and second magnetic field emission structures are located adjacent one another and have a certain alignment with respect to one another, and where each of the first and second magnetic field emission structures comprise an array of field emission sources each having positions and polarities relating to a desired spatial force function that corresponds to a relative alignment of the first and second magnetic field emission structures within a field domain. The first component and the second component can be released from each other when the first and second magnetic field emission structures are rotated with respect to one another.

Additional aspects of the invention will be set forth, in part, in the detailed description, figures and any claims, which follow, and in part will be derived from the detailed description, or can be learned by practice of the invention. It is to be understood that both the foregoing general description and the following detailed description are exemplary and explanatory only and are not restrictive of the invention as disclosed.

DESCRIPTION OF THE DRAWINGS

A more complete understanding of the present invention may be obtained by reference to the following detailed description when taken in conjunction with the accompanying drawings wherein:

FIGS. 1-9 are various diagrams used to help explain different concepts about correlated magnetic technology which can be utilized in an embodiment of the present invention;

DETAILED DESCRIPTION

The present invention includes a coupling device, which utilizes correlated magnetic technology in place of traditional mechanical fasteners to allow a user to easily operably secure components of a compressed gas system, more specifically but not by way of limitation a scuba air system. Utilization of correlated magnetic technology is a significant improvement over convention coupling devices that use threads, clamps or other known fastening devices so an individual can operably couple components of a scuba air system. This significant improvement over the state-of-art is attributable, in part, to the use of an emerging, revolutionary technology that is called correlated magnetics.

Correlated magnetics was first fully described and enabled in the co-assigned U.S. patent application Ser. No. 12/123, 718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358, 423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476, 952 filed on Jun. 2, 2009 and entitled "A Field Emission System and Method". The contents of this document are hereby incorporated herein by reference. Correlated inductance technology, which is related to correlated magnetics technology, is described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic light of the present invention.

Correlated Magnetics Technology

This section is provided to introduce the reader to correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
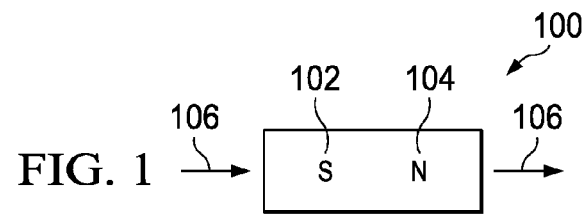

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
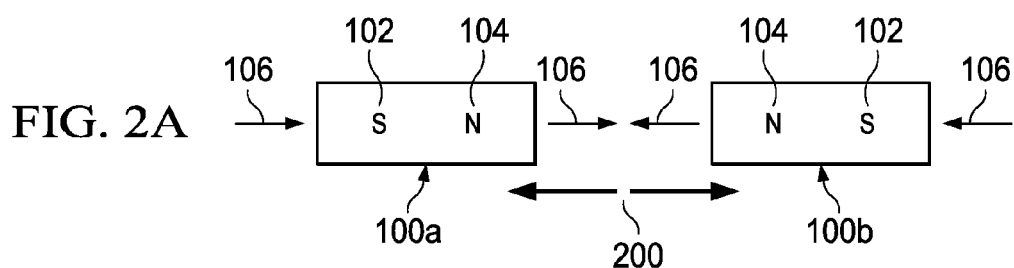
Figure 2B:
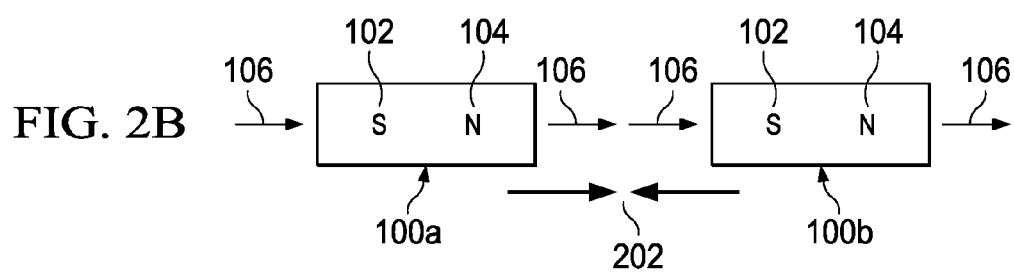
Figure 2C:
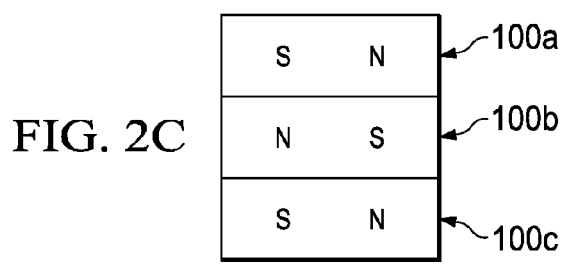

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent applications Ser. Nos. 12/123,718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4B:
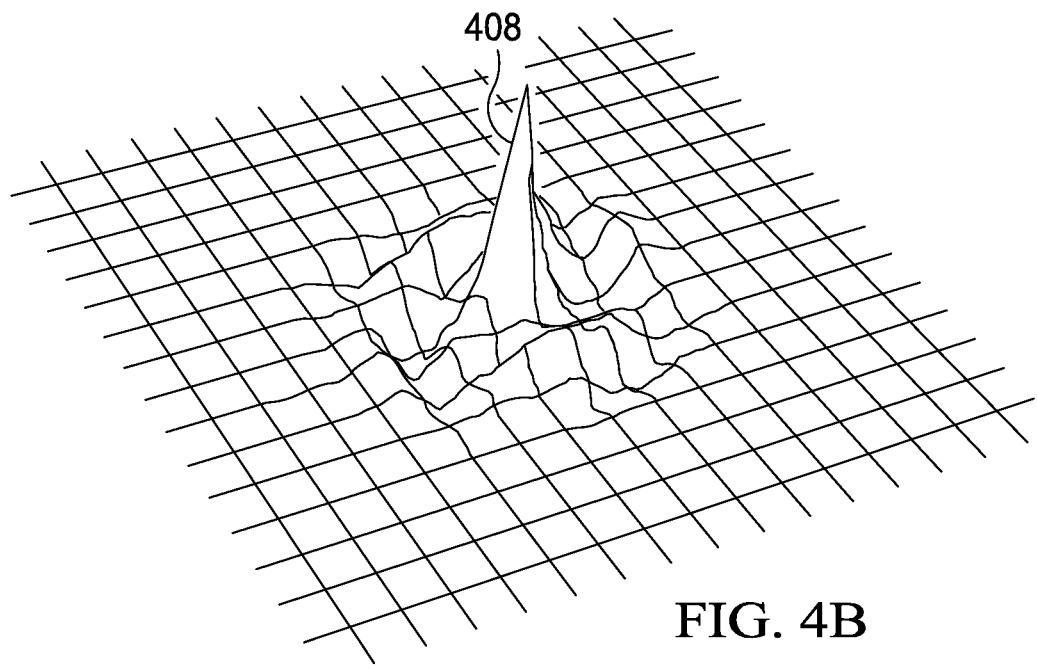
Figure 4C:
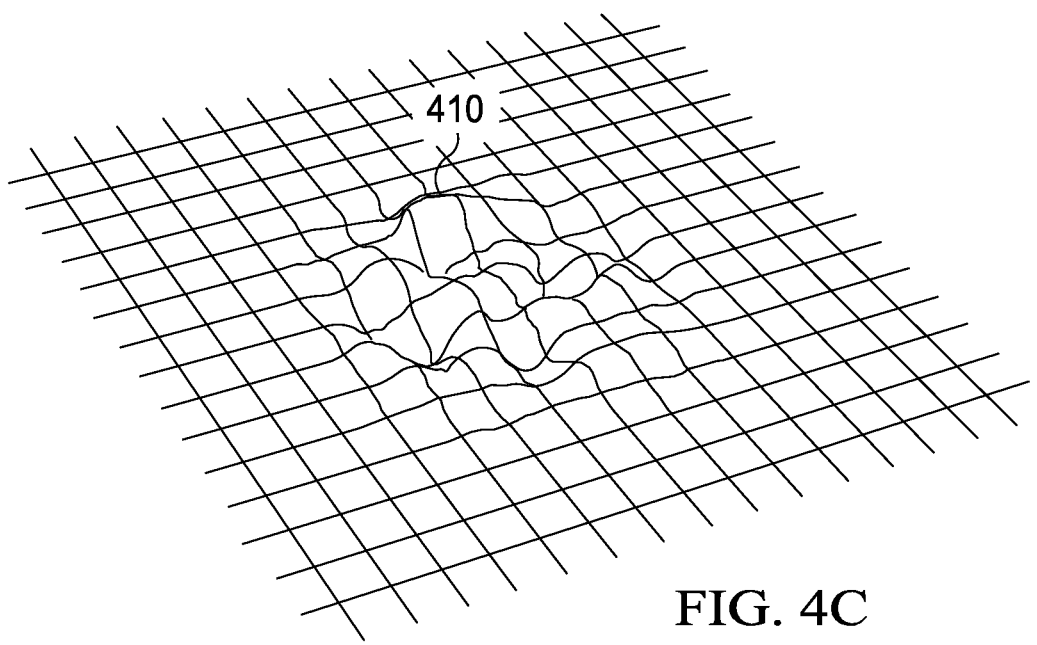

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
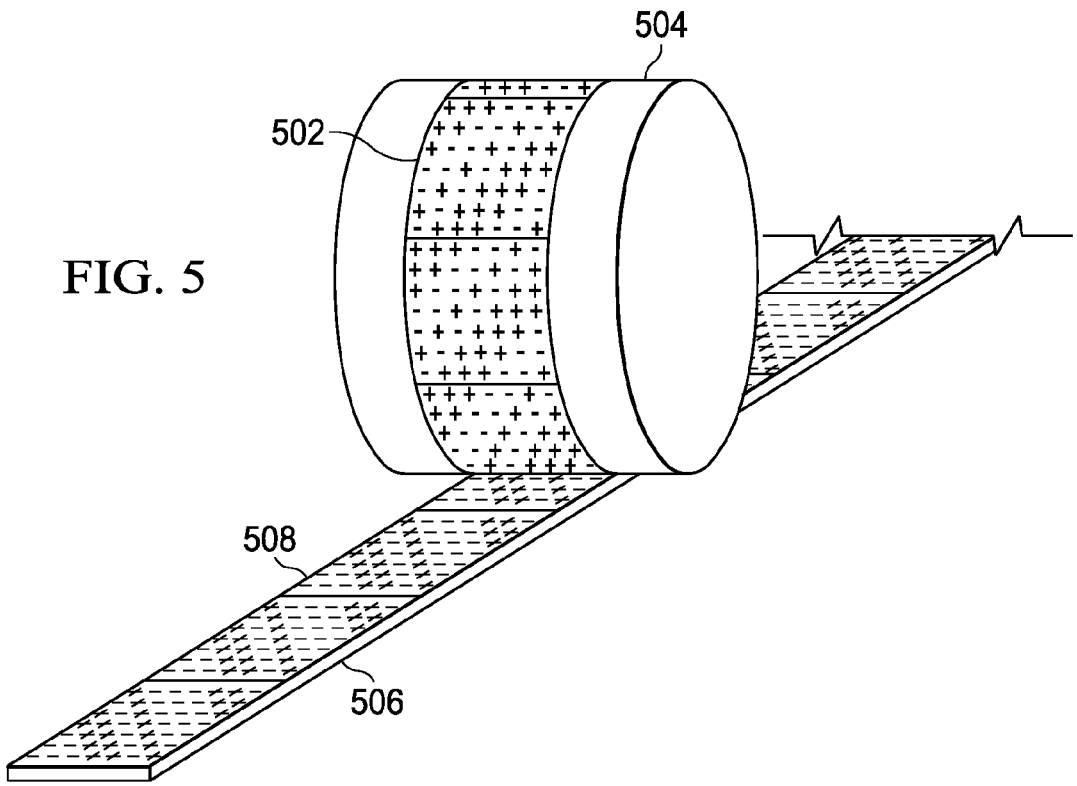

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
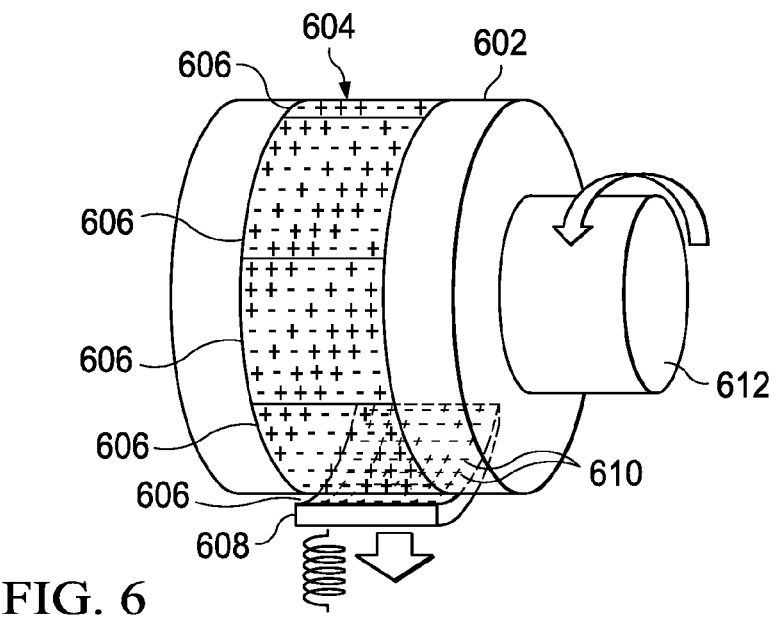

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc . . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
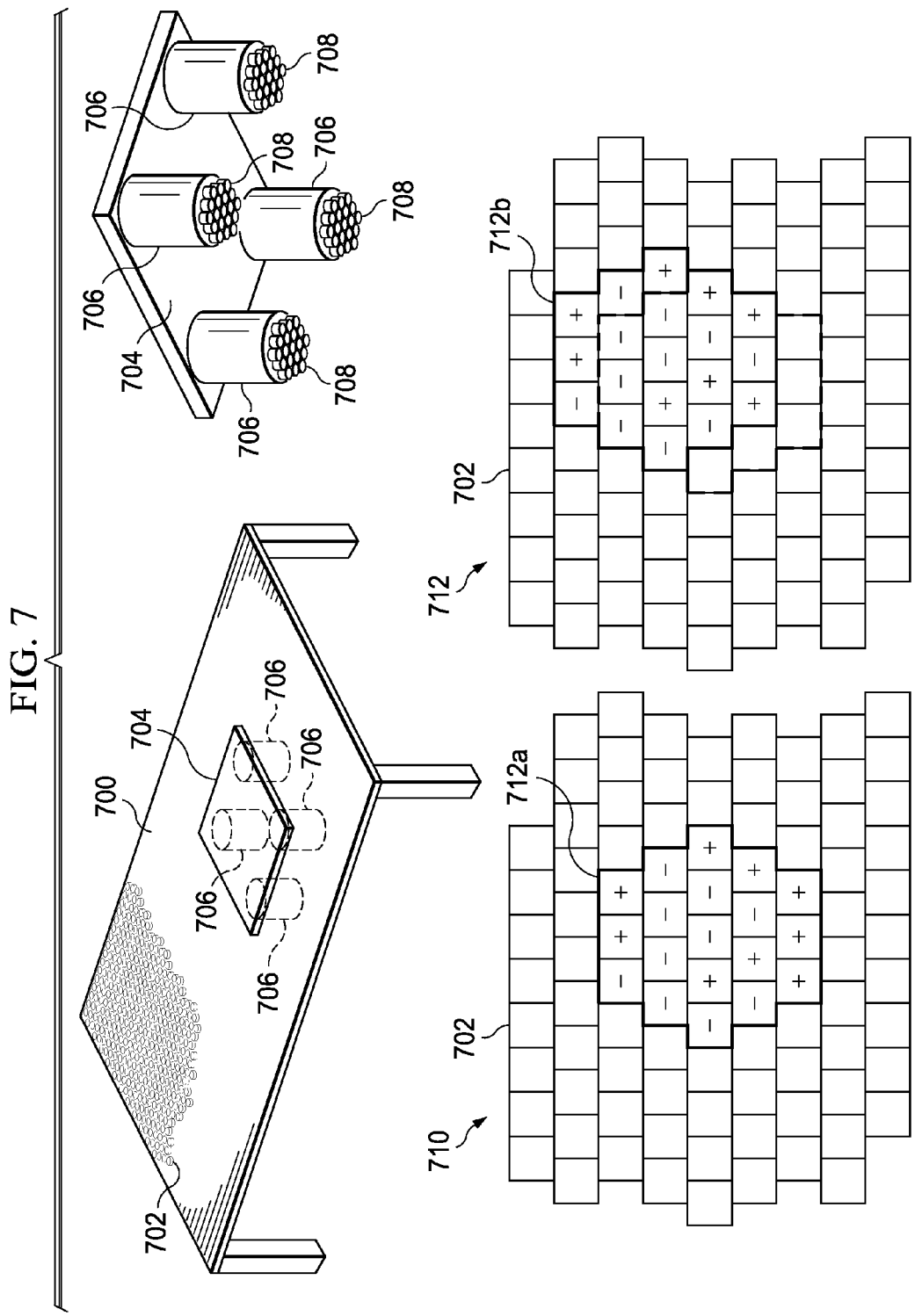

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
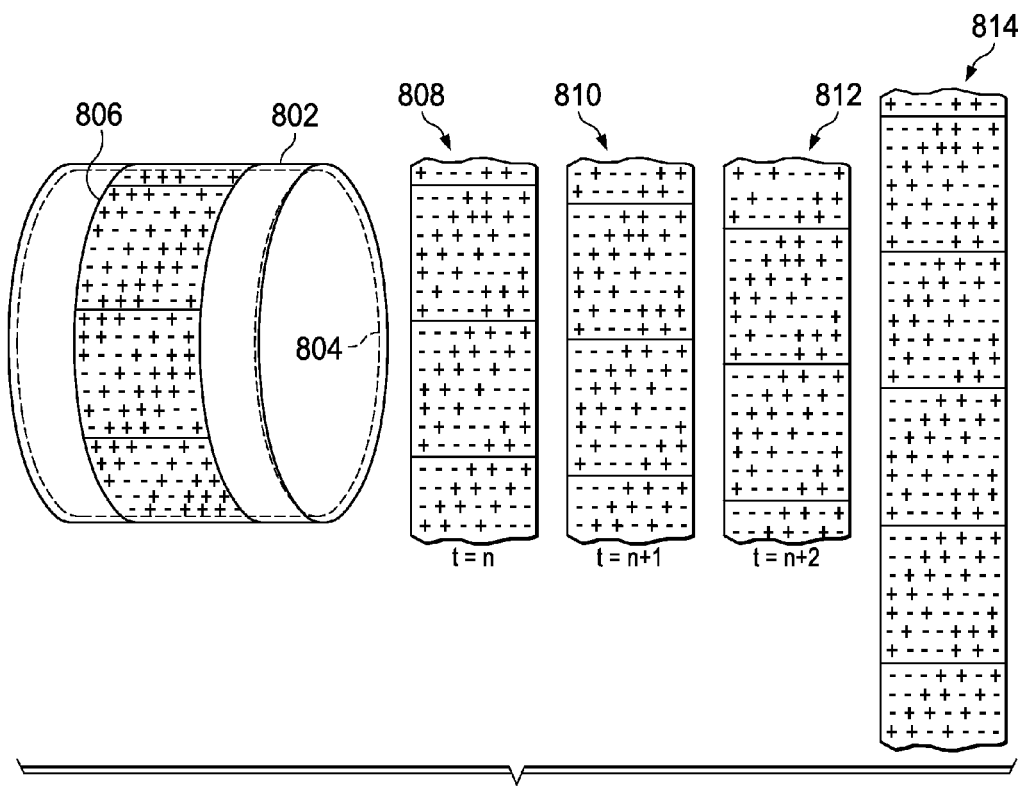

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
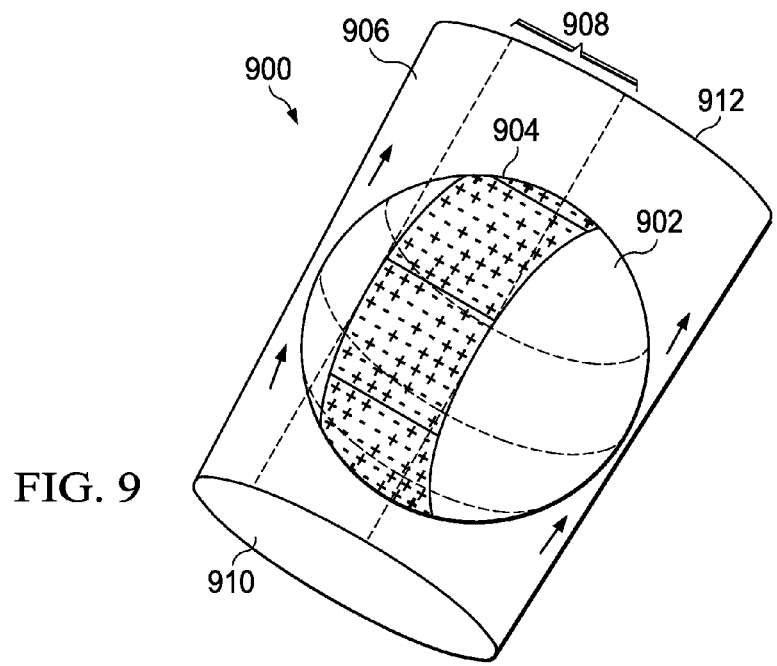

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of scaling mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Coupling Device

Figure 10A:
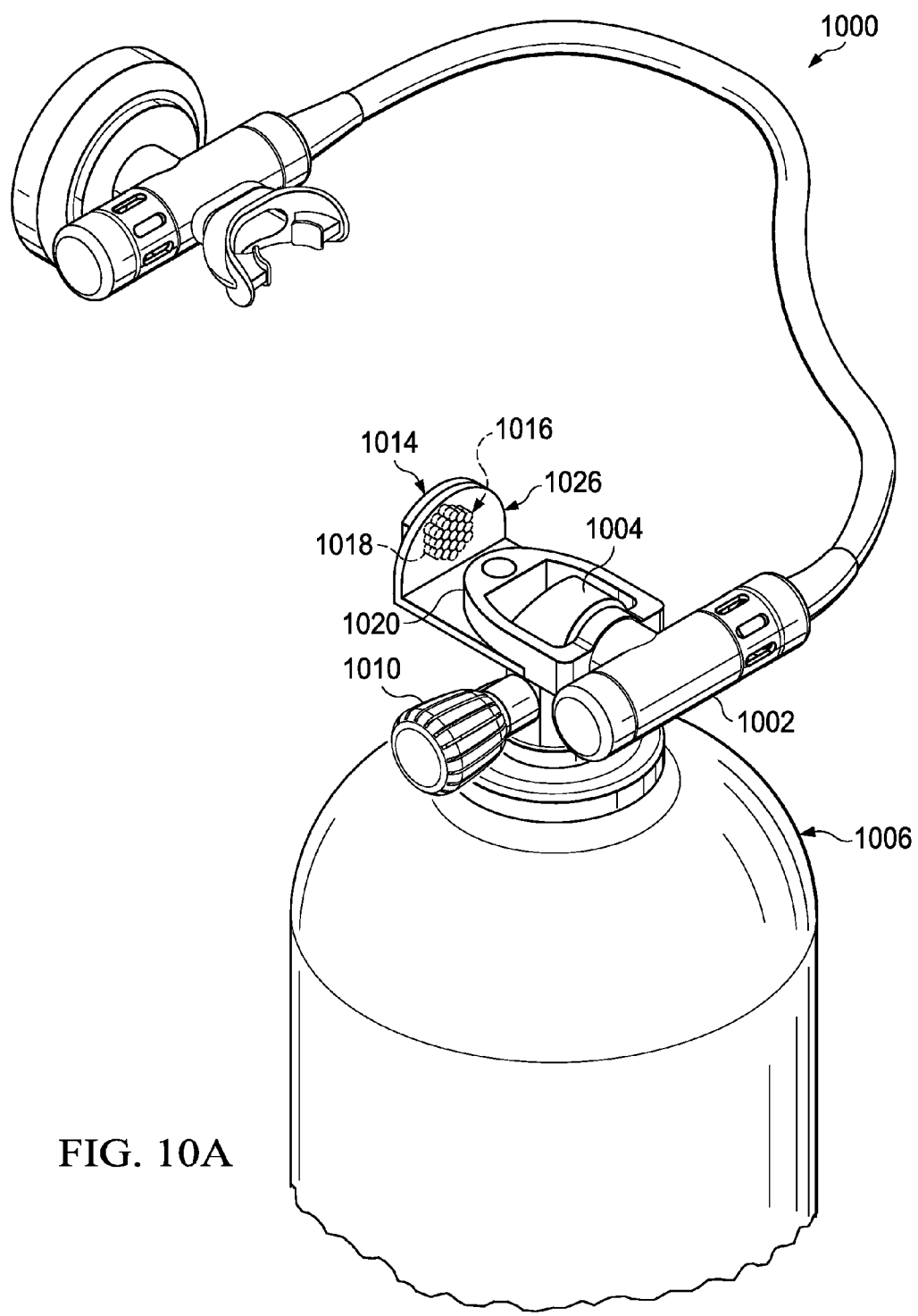
FIG. 10A illustrates an exemplary diagram of a first stage regulator operably coupled with an exemplary tank valve in accordance with an embodiment of the present invention.
Figure 10B:
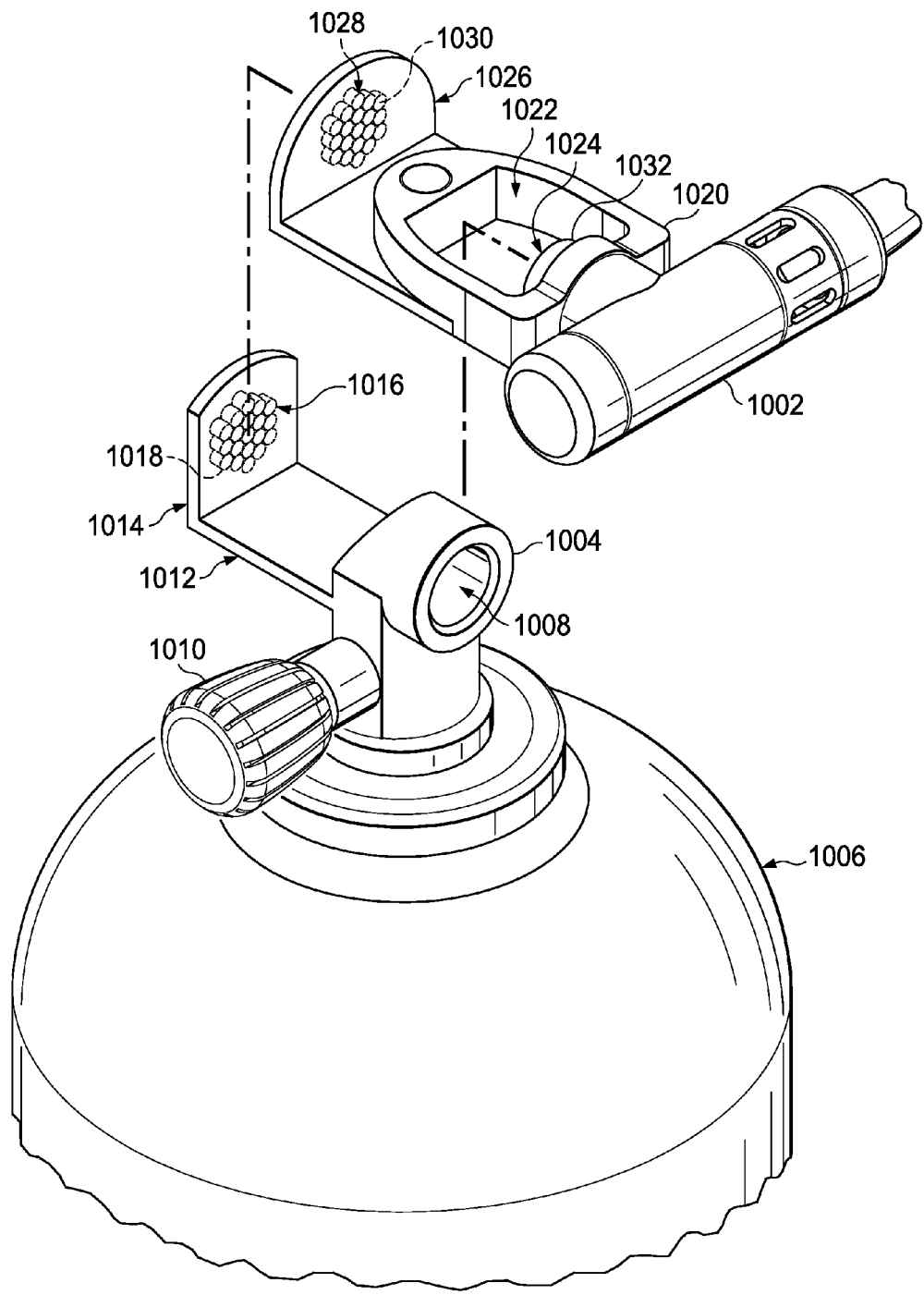
FIG. 10B is an exploded view of the exemplary first stage regulator and tank valve illustrated in FIG. 10A.

Referring to FIGS. 10A and 10B, there is disclosed a scuba system 1000. The scuba system includes a first stage regulator 1002 and a tank valve 1004 in accordance with the present invention. Although the exemplary first stage regulator 1002 and the exemplary tank valve 1004 of the present invention are described as being configured as part of a scuba air system, it is further contemplated within the scope of the present invention that similar tank valves and regulators could be configured for a wide variety of compressed gas systems. More specifically but not by way of limitation applications the tank valve 1004 and the first stage regulator 1002 could be configured for use in industrial compressed gas or laboratory compressed gas delivery systems. Accordingly, the tank valve 1004 and the first stage regulator 1002 should not be construed in a limited manner.

Still referring in particular to FIGS. 10A and 10B, there are diagrams of an exemplary first stage regulator 1002 and a tank valve 1004 configured to be operably coupled in accordance with an embodiment of the present invention. The tank valve 1004 is integrally mounted to an air tank 1006 and further includes an orifice 1008 and a flow controller 1010. A mount 1012 is integrally mounted to the tank valve 1004 opposite the orifice 1008 and is generally perpendicular therewith. The tank valve 1004 is constructed of suitable durable material and allows a user to access air disposed within the air tank 1006 through use of the flow controller 1010.

The mount 1012 is generally flat and has a support member 1014 that extends generally perpendicular at the end of the mount 1012. Integrally mounted on the support member 1014 of the mount 1012 is a first magnetic field emission structure 1016. The first magnetic field emission structure 1016 further includes a first array of field emission sources 1018.

Still referring to FIGS. 10A and 10B, the first stage regulator 1002 includes a frame 1020 having an opening 1022 configured to receive therethrough the tank valve 1004. The first stage regulator 1002 includes an aperture 1024 and is of sufficient size and shape to be mateably secured to the orifice 1008 so as to allow air to pass through. Extending from the frame 1020 is a support 1026 that extends in a generally perpendicular manner such as to be mateable with the support member 1014 of the mount 1012.

A second magnetic field emission structure 1028 is integrally mounted with the support member 1026. The second magnetic field emission structure 1028 further includes a second array of field emission sources 1030. Although the mount 1012 and the support member 1026 are illustrated herein as each having one magnetic emission structure, it is contemplated within the scope of the present invention that any number of magnetic emission structures could be utilized depending upon a number of factors, including the size, shape, and strength of the magnetic emissions structures and the size and shape of mounts. Depending on materials used, manufacturing reasons, or other reasons, the first and second magnetic field emission structures 1016 and 1028 may be integrally mounted on an inside surface, an outside surface, and/or within a material used to produce the regulator and valve. Therefore, such structures may not actually be visible to the user as illustrated herein.

The first and second magnetic field emission structures 1016 and 1028 are both in accordance with the same code but are a mirror image of one another (see FIGS. 4 and 13), such that during assembly of the first stage regulator 1002 and the tank valve 1004 when the magnetic field emission structure 1028 is located in certain proximity to the magnetic field emission structure 1016 and has a certain alignment with respect to one another, a peak attraction force will occur thus enabling the operable secure coupling of the first stage regulator 1002 to the tank valve 1004. It is contemplated within the scope of the present invention that the first and second magnetic field emission structures 1016 and 1028 could be coded to produce resulting spatial attraction forces or repelling forces in order to facilitate the operable coupling of the first stage regulator 1002 and the tank valve 1004. Good results have also been achieved when the first and second magnetic field emission structures 1016 and 1028 are coded to promote an exacting and specific orientation when coupling the first stage regulator 1002 to the tank valve 1004.

The attachment and de-attachment of the first stage regulator 1002 and the tank valve 1004 is possible because the first and second magnetic field emission structures 1016 and 1028 comprise first and second arrays of field emission sources 1018 and 1030, respectively (e.g., arrays of magnets) each having positions and polarities relating to a desired spatial force function that corresponds to a relative alignment of the first and second magnetic field emission structures 1016 and 1028 within a field domain (see discussion about correlated magnet technology). When a user places the first stage regulator 1002 over the tank valve 1004 such that the tank valve 1004 is at least partially journaled through the opening 1022 of the frame 1020, and when the support member 1026 is generally proximate to the support member 1014 a peak spatial attraction force occurs between the first and second magnetic field emission structures 1016 and 1028 such that the flange 1032 is moved towards and inserted into the orifice 1008 with sufficient force so as to create a airtight seal between the tank valve 1004 and the first stage regulator 1002.

To facilitate the separation of magnetic field emission structures 1016 and 1028 from each other, and thus the separation of first stage regulator 1002 from tank valve 1004, one or both of magnetic field emission structures 1016 and 1028 would be rotatably mounted so as to allow the offset of the magnetic field emission structures 1016 and 1028 with respect to each other as described below in reference to FIGS. 13A-13I and FIGS. 14A-14C.

It is further contemplated within the scope of the present invention that either of magnetic field emission structures 1016 or 128 could have mounted thereto a pin, knob or other release mechanism so as to provide a user an interface for rotating one of the magnetic emission structures 1016 and 1028 with respect to the other.

Figure 11A:
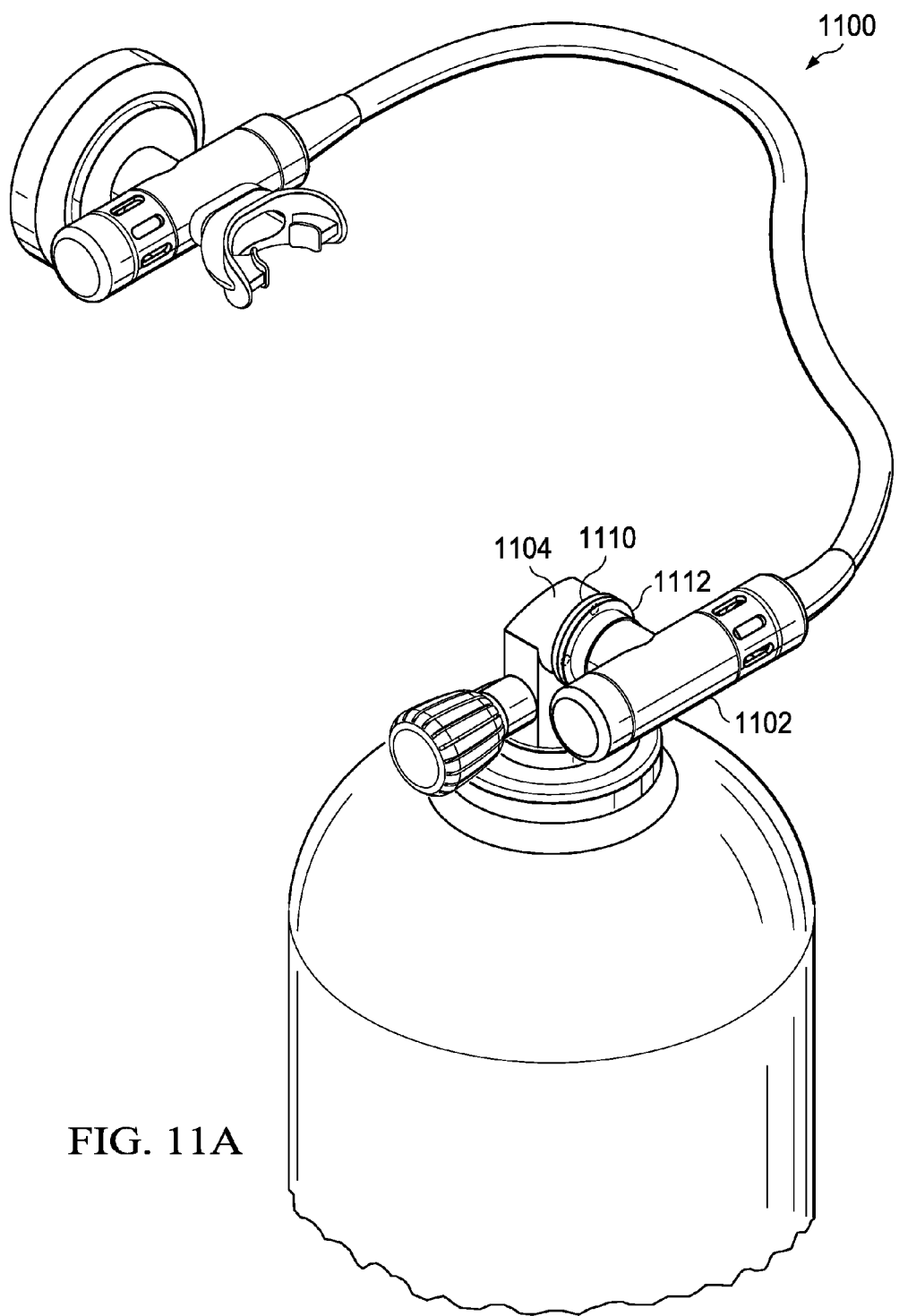
FIG. 11A illustrates an alternative exemplary first stage regulator and an alternative exemplary tank valve in accordance with an embodiment of the present invention.
Figure 11B:
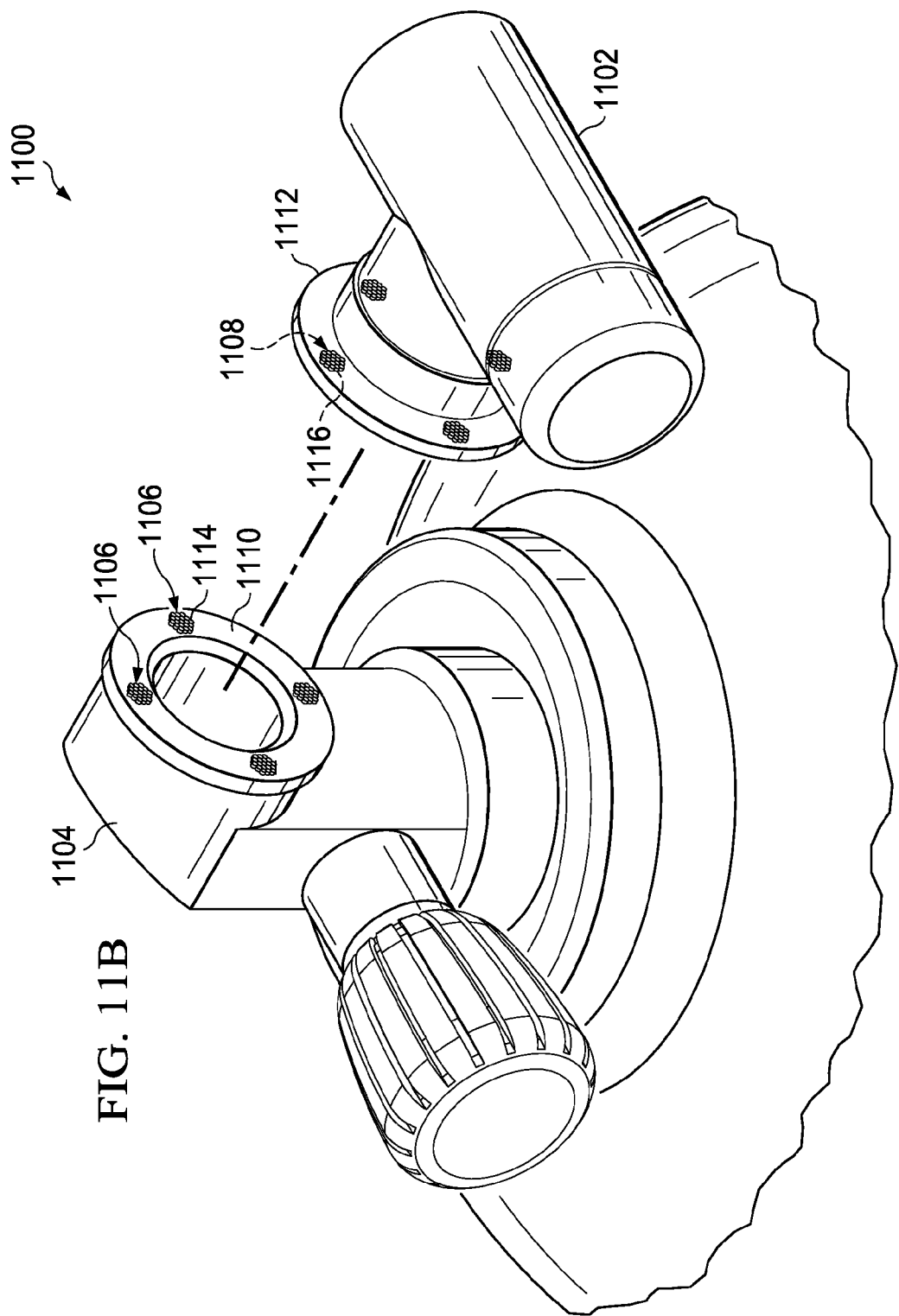
FIG. 11B is an exploded view of the alternative exemplary first stage regulator and tank valve illustrated in FIG. 11A.

Referring now to FIGS. 11A and 11B, there is illustrated a scuba system 1100 including another embodiment of a first stage regulator 1102 and a tank valve 1104 removably secured and sealed together utilizing first and second magnetic field emission structures 1106 and 1108.

The tank valve 1104 and the first stage regulator 1102 include matching generally planar flanges 1110 and 1112. The first magnetic field emission structure 1106 is integrated about the circumference of flange 1110 and the second magnetic field emission structure 1108 is integrated about the circumference of flange 1112. The first and second magnetic field emission structures 1106 and 1108 include first and second arrays of field emission sources 1114 and 1116 (respectively). The first and second magnetic field emissions structures 1106 and 1108 are in accordance with the same code but are a mirror image of one another, such that, during assembly of the first stage regulator 1102 and the tank valve 1104, when the first magnetic field emission structure 1108 is located in certain proximity to the corresponding second magnetic field emission structure 1106 and the two structures have a certain alignment with respect to one another, the operable coupling and sealing of the first stage regulator 1102 to the tank valve 1104 is accomplished with sufficient force to facilitate an airtight seal therebetween. It is further contemplated within the scope of the present invention that the tank valve 1104 or the first stage regulator 1102 could further include an o-ring or gasket to facilitate the necessary seal therebetween.

Figure 14A:
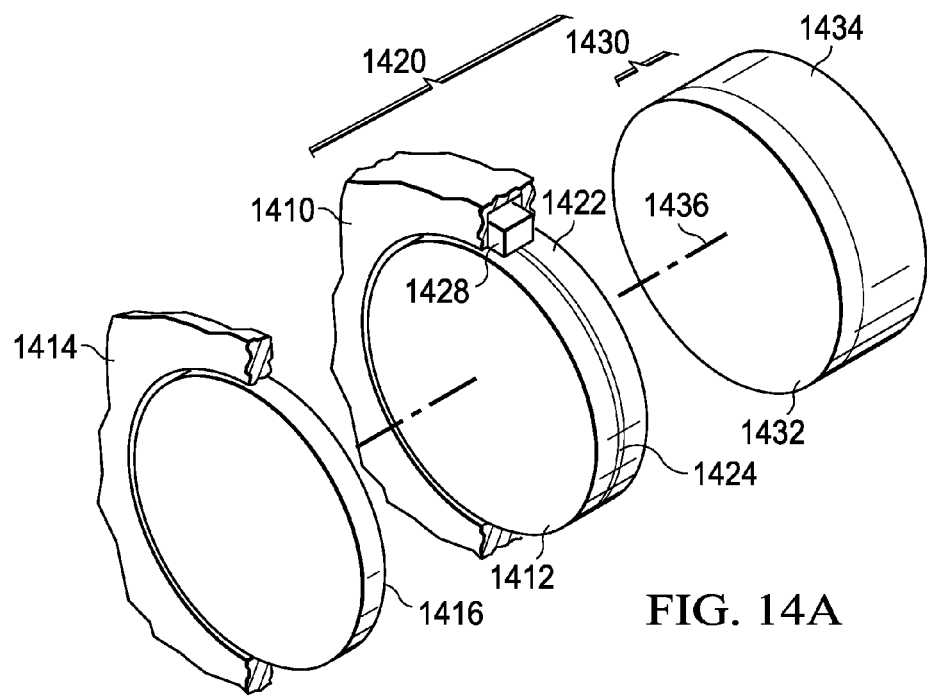
FIGS. 14A-14C illustrate several diagrams of an exemplary release mechanism that can be incorporated within the components of the embodiments of the present invention.
Figure 14B:
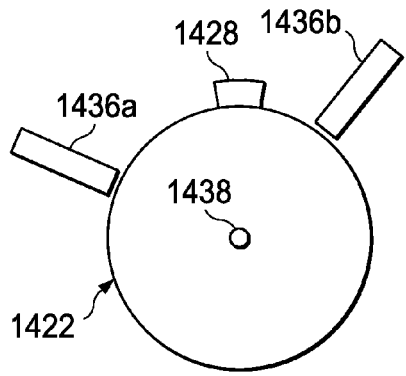
Figure 14C:
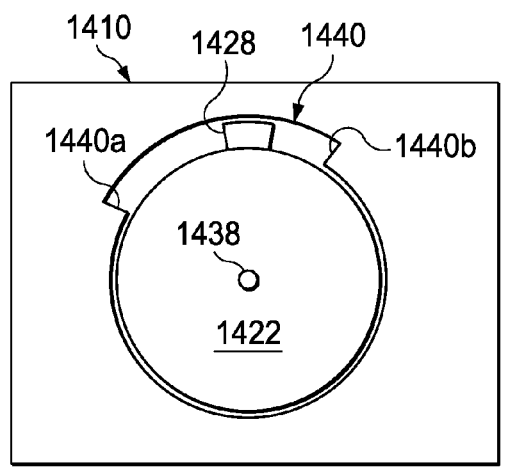

The removal or separation of first stage regulator 1102 from tank valve 1104 is accomplished by separating the attached first and second magnetic field emission structures 1106 and 1108. In particular, the first stage regulator 1102 can be released from the tank valve 1104 when the first stage regulator 1102 is rotated in relation to the tank valve 1104, which will in turn, misalign corresponding first and second magnetic field emission structures 1106 and 1108. If desired, as illustrated in FIGS. 14A-14C a release mechanism can be used to turn one of the magnetic field emission structures with respect to other.

Although scuba system 1100 is illustrated with four of each of the magnetic field emission structures 1106 and 1108, various numbers and different types of magnetic field emission structures could be used and still perform the desired function as described herein. It should also be recognized that the first and second magnetic field emission structures 1106 and 1108 could be coded so as to utilize spatial attraction or repelling forces to facilitate the operable coupling of the tank valve 1104 and first stage regulator 1102. Additionally, the first and second magnetic field emission structures 1106 and 1108 could be coded so as to promote a specific orientation of the first stage regulator 1102 with respect to the tank valve 1104 upon being operably coupled. Depending on materials used, manufacturing reasons, or other reasons, the first and second magnetic field emission structures 1106 and 1108 may be integrally mounted on an inside surface, an outside surface, and/or within a material used to produce the regulator and valve. Therefore, such structures may not actually be visible to the user as illustrated herein.

Figure 11C:
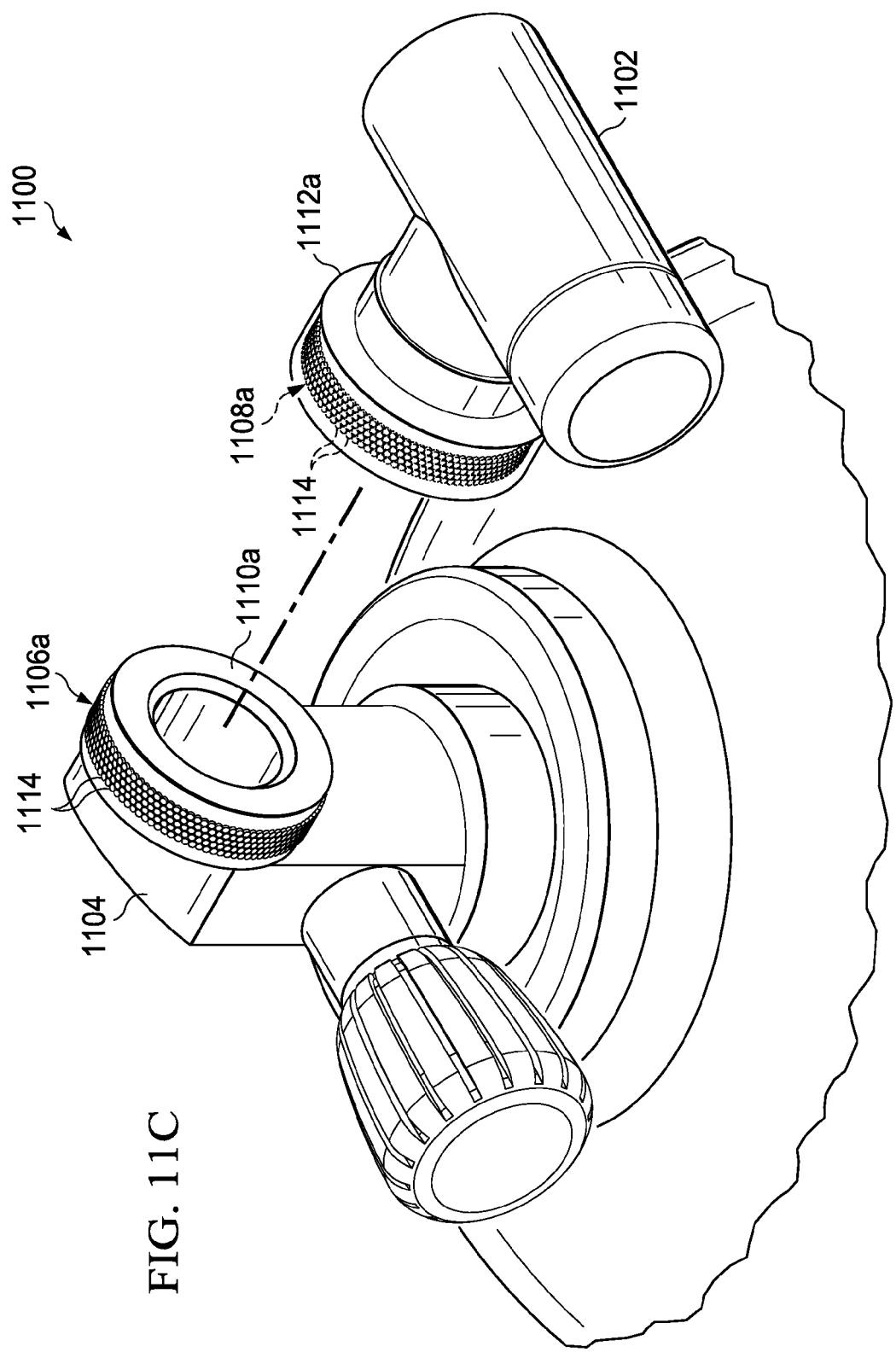
FIG. 11C is an exploded view of an alternative exemplary first stage regulator and tank valve as similarly illustrated in FIGS. 11A and 11B.

Referring now to FIG. 11C, there is illustrated an alternative embodiment of scuba system 1100 as similarly illustrated in FIGS. 11A and 11B. It is noted that the elements of scuba system 1100 illustrated in FIG. 11C that are substantially the same as illustrated in FIGS. 11A and 11B are depicted with identical references numerals and are as described above. As depicted in FIG. 11C, the tank valve 1104 includes a flange 1110a with the first magnetic field emission structure 1106a integrally mounted about the outer perimeter thereon. The first stage regulator 1102 includes the flange 1112a which is sized and shaped to fit about the flange 1110a of the tank valve 1104. Flange 1112a includes a second magnetic field emission structure 1108a integrally mounted about the inner perimeter thereof. The first magnetic field emission structure 1106a and the second magnetic field emission structure 1108a each include an array of field emission sources 1114 as similarly described herein. Each of the first magnetic field emission structure 1106a and the corresponding second magnetic field emission structure 1108a can be coded as a single encoded structure or as coded sections, with the first magnetic field emission structure 1106a and the second magnetic field emission structure 1108a being encoded to be mirror images of one another. The coding is such that when the first magnetic field emission structure 1106a is located in certain proximity to the second magnetic field emission structure 1108a with certain alignment with respect to one another, the securing and sealing of the first stage regulator 1102 to the tank valve 1104 is accomplished.

Subsequent to the coupling of the first stage regulator 1102 to the tank valve 1104, the flange 112a of the first stage regulator 1102 can be rotated with respect to the flange 1110a of the tank valve 1104 to a position such that a peak spatial attraction force exists between the first magnetic field emission structure 1106a and the second magnetic field emission structure 1108a, thereby pulling and securing the first stage regulator 1102 to the tank valve 1104 with the second magnetic field emission structure 1108a of the first stage regulator 1102 positioned about and contiguous with the first magnetic field emission structure 1106a of the tank valve 1104.

Still referring to FIG. 11C, the removal of the first stage regulator 1102 from the tank valve 1104 is accomplished by rotating the flange 1112a of the first stage regulator 1102 with respect to the flange 1110a of the tank valve 1104. The rotation misaligns the corresponding first magnetic field emission structure 1106a from the second magnetic field emission structure 1108a removing each from a position of peak spatial attraction force, thereby permitting the removal of the first stage regulator 1102 from the tank valve 1104.

Figure 12A:
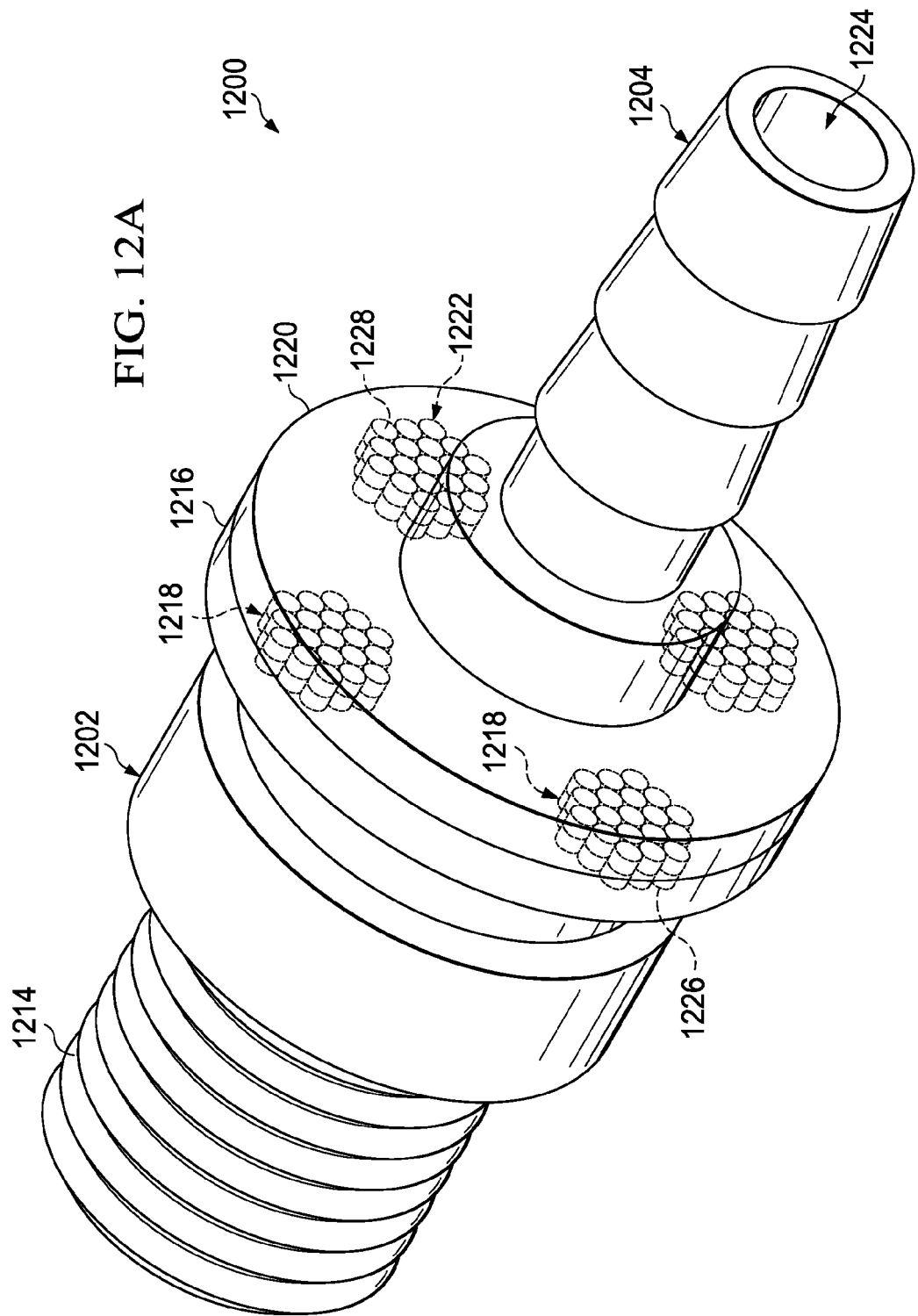
FIG. 12A is a perspective view of an assembled ball valve air hose union.
Figure 12B:
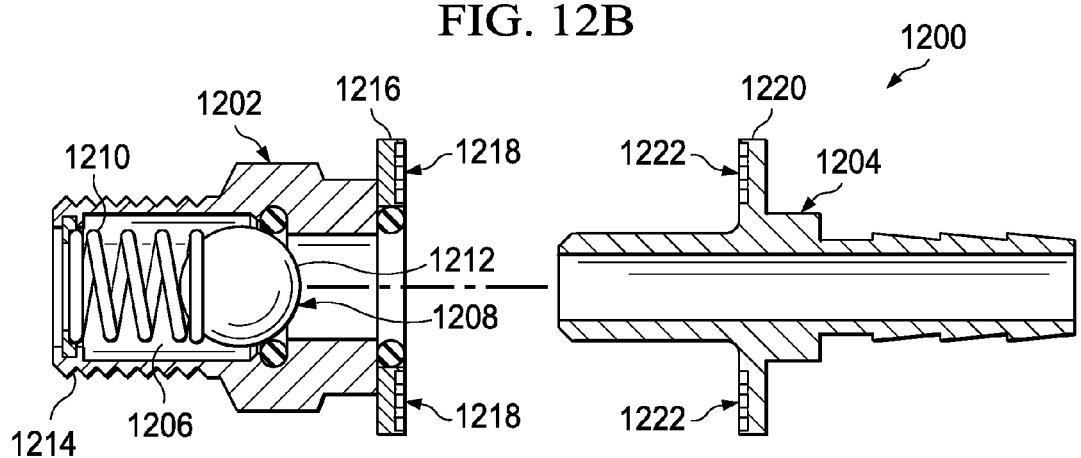
FIG. 12B is an exploded cross-sectional view of the air hose union as shown in FIG. 12A.
Figure 12C:
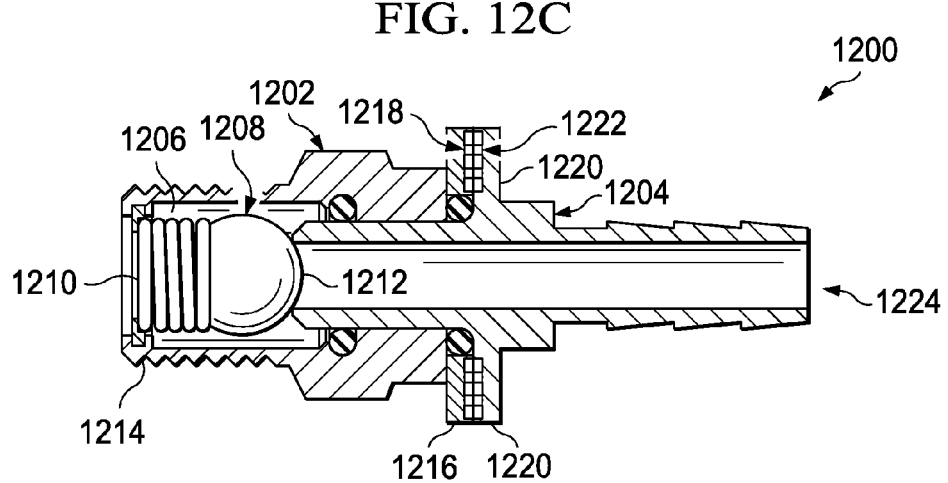
FIG. 12C in an assembled cross-sectional view of an air hose union as similarly shown in FIGS. 12A and 12B.

Referring now to FIGS. 12A, 12B and 12C, there is illustrated a quick connect air hose coupling 1200. The coupling 1200 includes a female element 1202 and a male element 1204, having an uncoupled position (FIG. 12B) and a coupled position (FIGS. 12A and 12C). The female element 1202 is generally cylindrical in shape having a cavity 1206 sufficient in size to house a ball valve 1208. The ball valve 1208 illustrated herein is a conventional ball valve having a spring 1210 and a ball 1212 that functions to permit or restrict gas flow through the cavity 1206. The female element 1202 includes a threaded portion 1214 that is configured to be releasably secured to an air system component. More specifically but not by way of limitation a user could releasably secure the female element 1202 to a port on a first stage regulator, a second stage regulator, an air gauge, a second stage regulator, a dive computer, a buoyancy control device or other scuba air system accessory. While the female element 1202 is illustrated herein as having threads portion 1214 it is further contemplated within the scope of the present invention that a magnetic field emission structure(s) could be integrally mounted thereto to facilitate the securing of the female element 1202 to an air system component having a corresponding magnetic field emission structure(s).

The female element 1202 further includes a flange 1216 that is generally planar and includes a first magnetic field emission structure 1218. The male element 1204 includes a flange 1220 that is generally planar and includes a second magnetic field emission structure 1222. The first and second magnetic field emissions structures 1218 and 1222 are in accordance with the same code but are a mirror image of one another, such that, during assembly of the male element 1204 with the female element 1202, the corresponding second magnetic field emission structure 1222 is located in certain proximity to the first magnetic field emission structure 1218 and the structures have a certain alignment with respect to one another. The operable coupling and sealing of the male portion 1204 with the female portion 1202 is accomplished with sufficient force to facilitate a substantially airtight seal therebetween. As shown in particular in FIG. 12C, subsequent the coupling, gas can pass through the channel 1224 and is permitted to flow to its connected component.

The attachment and de-attachment of the male element 1204 and the female element 1202 occurs because the first and second magnetic field emission structures 1218 and 1222 comprise first and second arrays of field emission sources 1226 and 1228 (e.g., arrays of magnets) having positions and polarities relating to a desired spatial force function that corresponds to a relative alignment of the first and second magnetic field emission structures 1218 and 1222 within a field domain (see discussion about correlated magnet technology).

The removal or separation of the male element 1204 from the female element 1202 is accomplished by separating the attached first and second magnetic field emission structures 1218 and 1222. In particular, the male element 1204 can be released from the female element 1202 when the flange 1220 of male element 1204 is rotated in relation to the flange 1216 of female element 1202 which will in turn, misaligns the first and second magnetic field emission structures 1218 and 1222. If desired, as illustrated in FIGS. 14A-14C, a release mechanism can be used to turn one of the magnetic field emission structures with respect to the other. Additionally, the first and second magnetic field emission structures shown in FIGS. 12A-12C are exemplary and can be replaced by different numbers, types, and shapes of magnetic field emission structures such as with circular magnetic field emission structures. Furthermore, a conventional gasket or other type of sealing mechanism can be used to achieve a airtight seal between the male element and the female element.

It is further contemplated that one of the group of magnetic field emission structures 1218 and 1222 could have mounted thereto a knob or other release mechanism so as to provide a user an interface for rotating one of the magnetic emission structures with respect to the other corresponding magnetic emission structure so as to reduce the peak spatial force therebetween and facilitate decoupling.

Figure 13A:
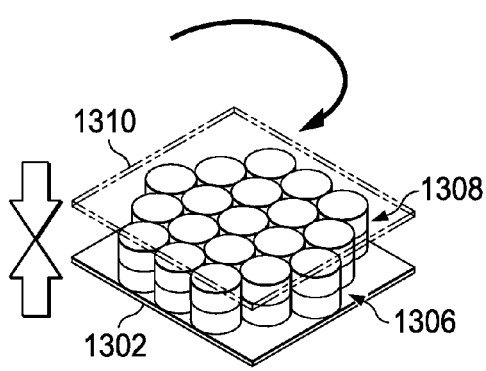
FIGS. 13A-13I are several diagrams that illustrate a portion of the components of the present invention which is used to show how an exemplary magnetic field emission structures can be aligned or misaligned relative to each other to enable one to secure or remove one magnetic field emission structure from a second magnetic field emission structure.

Referring to FIGS. 13A-13I, there is depicted an exemplary first magnetic field emission structure 1306 (attached to the exemplary embodiments of the present invention 1016, 1106 and 1218) and its mirror image second magnetic field emission structure 1308 (attached to a portion of the exemplary embodiments of the present invention 1028, 1108 and 1222) and the resulting spatial forces produced in accordance with their various alignments as they are twisted relative to each other which enables one to operably couple or de-couple the tank valve 1004 and the first stage regulator 1002, the tank valve 1104 and the first stage regulator 1102, and the female element 1202 and the male element 1204. FIG. 13A illustrates the magnetic field emission structure 1306 and the mirror image second magnetic field emission structure 1308 being aligned producing a peak spatial force.

Figure 13D:
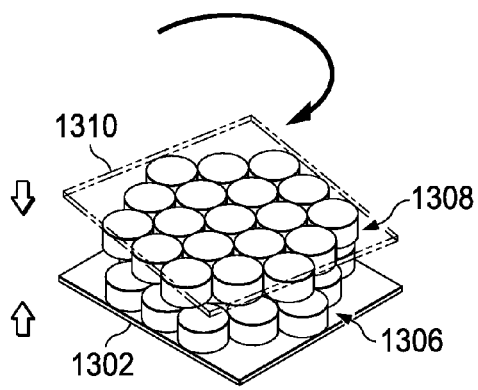
Figure 13B:
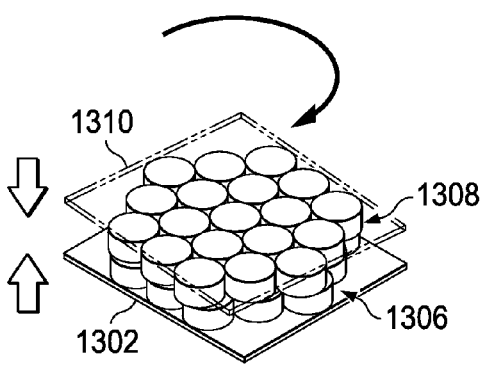
Figure 13E:
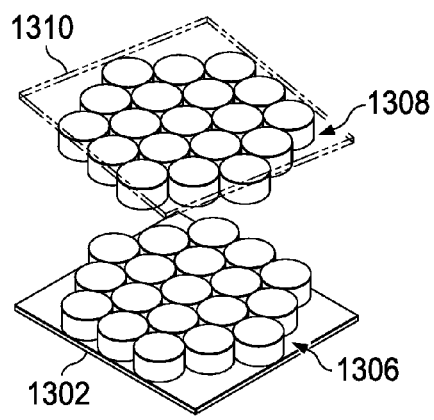
Figure 13C:
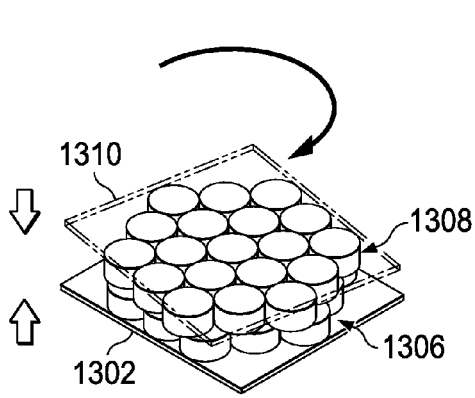
Figure 13F:
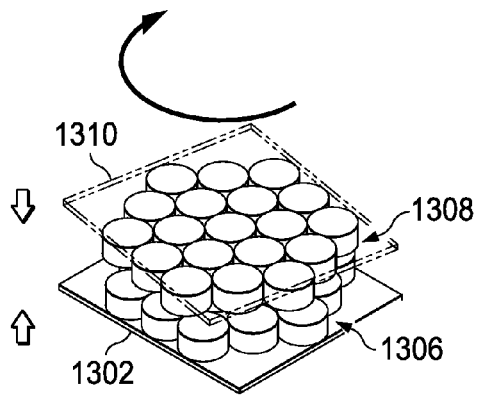
Figure 13G:
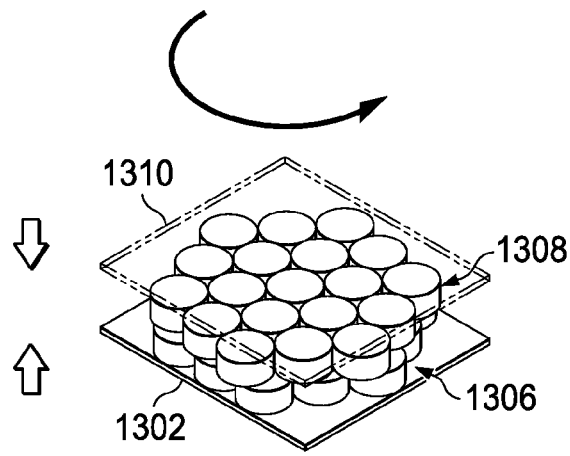
Figure 13H:
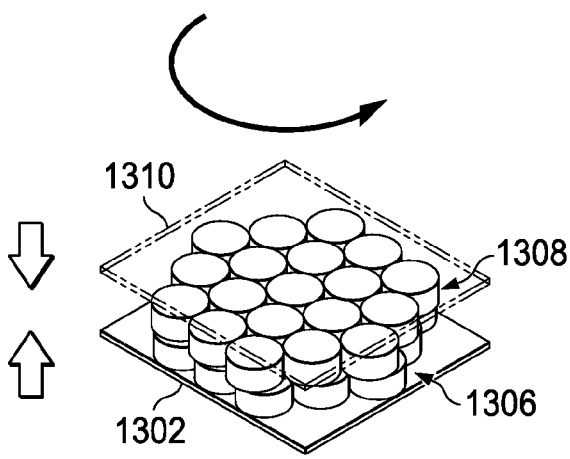
Figure 13I:
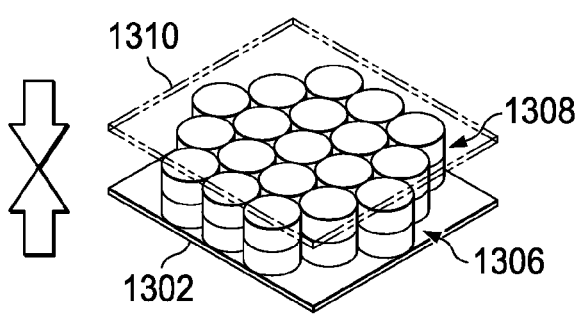

FIG. 13B illustrates the mirror image magnetic field emission structure 1308 being slightly askew relative to the magnetic field emission structure 1306 and the attractive force reduces significantly. In FIG. 13C, the mirror image second magnetic field emission structure 1308 is further rotated or askew and the attractive force continues to decrease. In FIG. 13D, the mirror image second magnetic field emission structure 1308 is still further rotated until the attractive force becomes very small, such that the two magnetic field emission structures 1306 and 1308 are easily separated as shown in FIG. 13E. Given the two magnetic field emission structures 1306 and 1308 held somewhat apart as in FIG. 13E, the two magnetic field emission structures 1306 and 1308 can be moved closer towards alignment producing a small spatial force as in FIG. 13F. The spatial force increases as the two magnetic field emission structures 1306 and 1308 become more and more aligned in FIGS. 13G and 13H and a peak spatial force is achieved when aligned as in FIG. 13I. It should be noted that the direction of rotation was arbitrarily chosen and may be varied depending on the code employed. Additionally, the mirror image second magnetic field emission structure 1308 is the mirror of the first magnetic field emission structure 1306 resulting in an attractive peak spatial force (see also FIG. 3-4). This method of coupling or de-coupling is a marked-improvement over the existing technology in which conventional threads or other conventional fasteners are utilized having the problems associated therewith as previously described herein.

FIGS. 14A-14C illustrate and exemplary embodiment of a release mechanism as described herein above that is used to or rotate one magnetic field emission structure relative to the corresponding connecting magnetic field emission structure so as to couple or de-couple the two corresponding parts, such as the tank valve 1004 with the first stage regulator 1002, the tank valve 1104 with the first stage regulator 1102, and the female element 1202 with the male element 1204 (FIGS. 10A and 10B, 11A-11C and 12A-C)

In FIG. 14A, the one end 1410 has the magnetic field emission structure 1412 with a first code and the other end 1414 has the mirror image magnetic field emission structure 1416 also based on the first code. The magnetic field emission structure 1412 is physically secured to the release mechanism's magnetic field emission structure 1422 which has a second code. A separation layer 1424 made from a high permeability material may be placed between the two magnetic field emission structures 1412 and 1422 to keep their magnetic fields from interacting with one another. The two magnetic field emission structures 1412 and 1422 are configured so that they can turn about axis 1426 allowing them to be moved so as to allow attachment to and detachment from the magnetic field emission structure 1416 which enables the two ends 1410 and 1414 to be connected to and separated from one another. The release mechanism 1420 can also include at least one tab 1428 which is positioned to stop the movement of the two magnetic field emission structures 1412 and 1422, In addition, the release mechanism 1420 can include a key mechanism 1430 which has a magnetic field emission structure 1432 which is coded using the second code such that it corresponds to the mirror image of the magnetic emission field structure 1422. The key mechanism 1430 also includes a gripping mechanism 1434 that would typically be turned by hand. As shown, the key mechanism 1430 can be attached to the end 1410 by substantially aligning the two magnetic field structures 1422 and 1432. The gripping mechanism 1434 can then be turned about axis 1426 so as to align or misalign the two magnetic field emission structures 1412 and 1416, thereby attaching or detaching the two ends 1410 and 1414.

In FIG. 14B, there is depicted a general concept of using the tab 1428 so as to limit the movement of the two magnetic field emission structures 1412 and 1422 between two travel limiters 1436a and 1436b. The two magnetic field emission structures 1412 and 1422 are shown having a hole 1438 through their middle that enables them to turn about the axis 1426. The two travel limiters 1436a and 1436b might be any fixed object placed at desired locations that limit the turning radius of the two magnetic field emission structures 1412 and 1422.

FIG. 14C depicts an alternative approach where end 1410 includes a travel channel 1440 that is configured to enable the two magnetic field emission structures 1412 and 1422 to turn about the axis 1426 using hole 1438 and has travel limiters 1440a and 1440b that limit the turning radius. One skilled in the art would recognize that the tab 1428 and at least one travel limiter 1436a, 1436b, 1440a and 1440b are provided to simplify the detachment of key mechanism 1430 from the end 1410.

It is contemplated that the first and second field emissions structures described herein in the exemplary embodiments, are themselves exemplary. Generally, the field emission structures could have many different configurations and could be many different types including those comprising permanent magnets, electromagnets, and/or electro-permanent magnets where the size, shape, source strengths, coding, and other characteristics can be tailored to meet different correlated magnetic requirements.

It is also contemplated that the separation of the first and second field emission structures as described herein with respect to the exemplary embodiments can be detached by applying a pull force, shear force, or any other force sufficient to overcome the attractive peak spatial force between the substantially aligned first and second field emissions structures.

It is further contemplated within the scope of the present invention that the exemplary embodiments illustrated herein further include an additional magnetic field emission structure to facilitate the securing of the exemplary embodiments to an object having a corresponding magnetic field emission structure. More specifically but not by way of limitation the additional magnetic field emission structure could be releasably secured to a corresponding magnetic field emission structure integrally mounted on a storage rack, shelf, wall, a portion of a boat or numerous other types of storage devices that function to organize and store the exemplary embodiments illustrated herein. It is further contemplated within the scope of the present invention that each exemplary embodiment of the present invention depicted herein have magnetic field emission structures coded such that only particular exemplary embodiments could be operably secured to each other and further to control any specific required orientation of coupling the exemplary embodiments together. It should also be recognized that for all exemplary embodiments referenced herein that it is desirable to have a hermetic seal when any of the two exemplary embodiments are operably coupled.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A coupling device for elements of a compressed gas system comprising:
   a first component and a second component, said second component being releasably securable to said first component;
   said first component further including a first field emission structure; and
   said second component further including a second field emission structure where said second component is operably secured to said first component when said first and said second field emission structures are located proximate to one another and have a certain alignment with respect to one another, and where each of said first and second field emission structures include an array of field emission sources each having positions and polarities relating to a desired spatial force function that corresponds to a relative alignment of said first and second field emission structures within a field domain, said spatial force function being in accordance with a code, said code corresponding to a code modulo of said first array of field emission sources and a complementary code modulo of said second array of field emission sources, said code defining a peak spatial force corresponding to substantial alignment of said code modulo of said first array of field emission sources with said complementary code modulo of said second array of field emission sources, said code also defining a plurality of off peak spatial forces corresponding to a plurality of different misalignments of said code modulo of said first array of field emission sources and said complementary code modulo of said second array of field emission sources, said plurality of off peak spatial forces having a largest off peak spatial force, said largest off peak spatial force being less than half of said peak spatial force.

2. The coupling device of claim 1, wherein said second component is released from said first component when said first and said second field emission structures changed from said certain alignment with respect to one another.

3. The coupling device of claim 2, wherein said first and second component are at least one of the following: a first stage regulator, a second stage regulator, an air pressure gauge, a dive computer, an air hose, a tank valve and a buoyancy control device.

4. The coupling device of claim 3, and further including a release mechanism that turns said second field emission structure with respect to said first field emission structure so as to facilitate the release and attachment of said first component from said second component.

5. The coupling device of claim 1, wherein said first field emission structure and said second field emission structure releasably secure said first and second components in a substantially hermetic manner.

6. The coupling device of claim 4, wherein said first component includes a plurality of said first field emission structures and said second component includes a plurality of said second field emission structures, where any one of said plurality of said first field emissions structures operable to interact any one of said plurality of said second field emissions.

7. The coupling device of claim 4, and further including a third field emission structure operable to connect to a fourth field emission structure integrated with an object to facilitate the connection of the said first or second component to the object.

8. The coupling device of claim 1, wherein said positions and said polarities of each field emission source of each said array of field emission sources are determined in accordance with at least one correlation function.

9. The coupling device of claim 8, wherein said at least one correlation function is in accordance with at least one code.

10. The coupling device of claim 9, wherein said at least one code is at least one of a pseudorandom code, a deterministic code, or a designed code.

11. The coupling device of claim 9, wherein said at least one code is one of a one dimensional code, a two dimensional code, a three dimensional code, or a four dimensional code.

12. The coupling device of claim 1, wherein each field emission source of each said array of field emission sources has a corresponding field emission amplitude and vector direction determined in accordance with the desired spatial force function, wherein a separation distance between the first and second field emission structures and the relative alignment of the first and second field emission structures creates a spatial force in accordance the desired spatial force function.

13. The coupling device of claim 12, wherein said spatial force comprises at least one of an attractive spatial force or a repellant spatial force.

14. The coupling device of claim 12, wherein said spatial force corresponds to a peak spatial force of said desired spatial force function when said first and second field emission structures are substantially aligned such that each field emission source of said first field emission structure substantially aligns with a corresponding field emission source of said second field emission structure.

15. The coupling device of claim 1, wherein said field domain corresponds to first field emissions from said array of first field emission sources of said first field emission structure interacting with second field emissions from said array of second field emission sources of said second field emission structure.

16. The coupling device of claim 1, wherein said polarities of the field emission sources comprise at least one of North-South polarities or positive-negative polarities.

17. The coupling device of claim 1, wherein at least one of said field emission sources comprises a magnetic field emission source or an electric field emission source.

18. The coupling device of claim 1, wherein at least one of said field emission sources comprises a permanent magnet, an electromagnet, an electret, a magnetized ferromagnetic material, a portion of a magnetized ferromagnetic material, a soft magnetic material, or a superconductive magnetic material.

19. A method for assembling at least two coupling elements of a compressed gas system, said method comprising the steps of:

selecting a first coupling component of a compressed gas system;

selecting a second coupling component of a compressed gas system;

securing said first coupling component to said second coupling component, where said first coupling component has mounted thereon a first field emission structure; and wherein said second coupling component has mounted thereon a second field emission structure, where the first coupling component is attached to said second coupling component when said first and second field emission structures are located next to one another and have a certain alignment with respect to one another, and where each of said first and second field emission structures comprise an array of field emission sources each having positions and polarities relating to a desired spatial force function that corresponds to a relative alignment of the first and second field emission structures within a field domain, said spatial force function being in accordance with a code, said code corresponding to a code modulo of said first array of field emission sources and a complementary code modulo of said second array of field emission sources, said code defining a peak spatial force corresponding to substantial alignment of said code modulo of said first array of field emission sources with said complementary code modulo of said second array of field emission sources, said code also defining a plurality of off peak spatial forces corresponding to a plurality of different misalignments of said code modulo of said first array of field emission sources and said complementary code modulo of said second array of field emission sources, said plurality of off peak spatial forces having a largest off peak spatial force, said largest off peak spatial force being less than half of said peak spatial force.

20. The method of claim 19, further comprising the step of releasing said first coupling component from said second coupling component.

21. The method of claim 20, wherein said step of releasing said first coupling component from said second coupling component further includes rotating the first and second field emission structures with respect to one another.

22. The method of claim 19, further comprising the step of: attaching one of the said first coupling component and said second coupling component to a second object, where the first or second coupling components have mounted thereon a third field emission structure, where the second object has attached thereto a fourth field emission structure, where each of said third and fourth field emission structures comprise an array of field emission sources each having positions and polarities relating to a second desired spatial force function that corresponds to a relative alignment of the third and fourth field emission structures within a second field domain, where the fourth field emission structure does not attach to the first field emission structure.

23. The method of claim 19, said first coupling component is a selected from one of the following: a first stage regulator, a second stage regulator, an air pressure gauge, a dive computer, an air hose, a tank valve and a buoyancy control device.

24. The method of claim 21, wherein the second coupling component is selected from one of the following: a first stage regulator, a second stage regulator, an air pressure gauge, a dive computer, an air hose, a tank valve and a buoyancy control device.

* * * * *